United States Patent
Saito et al.

(10) Patent No.: US 8,462,800 B2
(45) Date of Patent: Jun. 11, 2013

(54) GATEWAY DEVICE AND PORT NUMBER ASSIGNMENT METHOD

(75) Inventors: Shinichiro Saito, Kawasaki (JP); Shigehiro Onizawa, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 273 days.

(21) Appl. No.: 12/943,726

(22) Filed: Nov. 10, 2010

(65) Prior Publication Data

US 2011/0122880 A1 May 26, 2011

(30) Foreign Application Priority Data

Nov. 11, 2009 (JP) ................................ 2009-257722

(51) Int. Cl.
*H04L 12/28* (2006.01)
*H04J 3/22* (2006.01)

(52) U.S. Cl.
USPC .......................................... 370/401; 370/467

(58) Field of Classification Search
USPC ................. 370/252, 328, 329, 331, 400, 401, 370/409, 464–467
See application file for complete search history.

(56) References Cited

U.S. PATENT DOCUMENTS

| 6,611,533 B1 * | 8/2003 | Liao et al. | 370/467 |
| 8,145,788 B1 * | 3/2012 | Love et al. | 709/241 |
| 2005/0018651 A1 * | 1/2005 | Yan et al. | 370/352 |
| 2005/0117605 A1 * | 6/2005 | Yan et al. | 370/469 |
| 2005/0254482 A1 * | 11/2005 | Yeom | 370/352 |
| 2011/0026537 A1 * | 2/2011 | Kolhi et al. | 370/401 |
| 2011/0064075 A1 * | 3/2011 | Sprague et al. | 370/352 |

FOREIGN PATENT DOCUMENTS

| JP | 2005-073302 | 3/2005 |
| JP | 2009-015392 | 1/2009 |

OTHER PUBLICATIONS

Srisuresh, P., et al.; IP Network Address Translator (NAT) Terminology and Considerations; Aug. 1999, 26 pages; http://www.ietf.org/rfc/rfc2663.txt.

Tsirtsis, G., et al.; IP Network Address Translation—Protocol Translation (NAT-PT); Feb. 2000, 19 pages; http://www.ietf.org/rfc/rfc2766.txt.

* cited by examiner

*Primary Examiner* — Kerri Rose
(74) *Attorney, Agent, or Firm* — Foley & Lardner LLP (57) ABSTRACT

When streaming transfer of voice or image is performed using a real time streaming protocol (RTSP), streaming transfer of a high bit rate is enabled even in an environment of using network address port translation (NAPT) and network address translation-protocol translation (NAT-PT). When a SETUP message of RTSP is received, a port number having the same number of digits as a client port number notified by a client is assigned from a port number pool, and is registered in an NAPT table. The SETUP message is rewritten with the port number.

4 Claims, 11 Drawing Sheets

NAPT TABLE MEMBER 220

| ENTRY NO. | SOURCE IP ADDRESS 221 | SOURCE PORT NUMBER 222 | CONVERSION IP ADDRESS 223 | CONVERSION PORT NUMBER 224 | FINAL USE DATE AND TIME 225 |
|---|---|---|---|---|---|
| 1 | 192.168.1.10 | 6001 | 2.2.2.2 | 40001 | d1 h1:m1 |
| 2 | 192.168.1.10 | 6970 | 2.2.2.2 | 9000 | d2 h2:m2 |
| 3 | 192.168.1.10 | 6971 | 2.2.2.2 | 9001 | d3 h3:m3 |
| 4 | 192.168.1.30 | 5980 | 2.2.2.2 | 40002 | d4 h4:m4 |
| 5 | 192.168.1.20 | 10001 | 2.2.2.2 | 40003 | d5 h5:m5 |
| 6 | 192.168.1.20 | 12702 | 2.2.2.2 | 60000 | d6 h6:m6 |
| 7 | 192.168.1.20 | 12703 | 2.2.2.2 | 60001 | d7 h7:m7 |
| 8 | 192.168.1.30 | 4356 | 2.2.2.2 | 40004 | d8 h8:m8 |
| ... | | | ... | | |

(a)
| IP HEADER (Src IP:192.168.1.10, Dst IP:1.1.1.1) |
|---|
| TCP HEADER (Src Port:6001, Dst Port:554) |
| SETUP rtsp://foo.com/test.wav/streamid=0 RTSP/1.0<br>Transport:RTP/AVP/UDP;unicast;<br>       client_port=6970-6971;mode=play |

108A-2

(b)
| IP HEADER (Src IP:2.2.2.2, Dst IP:1.1.1.1) |
|---|
| TCP HEADER (Src Port:40001, Dst Port:554) |
| SETUP rtsp://foo.com/test.wav/streamid=0 RTSP/1.0<br>Transport:RTP/AVP/UDP;unicast;<br>       client_port=9000-9001;mode=play |

FIG. 8B 108A-3

(a)
| IP HEADER (Src IP:1.1.1.1, Dst IP:2.2.2.2) |
|---|
| TCP HEADER (Src Port:554, Dst Port:40001) |
| RTSP/1.0 200 OK<br>Transport:RTP/AVP/UDP;unicast;client_port=9000-9001;<br>       server_port=50000-50001;mode=play |

108A-4

(b)
| IP HEADER (Src IP:1.1.1.1, Dst IP:192.168.1.10) |
|---|
| TCP HEADER (Src Port:554, Dst Port:6001) |
| RTSP/1.0 200 OK<br>Transport:RTP/AVP/UDP;unicast;client_port=6970-6971;<br>       server_port=50000-50001;mode=play |

FIG. 9A 108B-1

(a)
| IP HEADER (Src IP: 192.168.1.20, Dst IP: 1.1.1.1) |
|---|
| TCP HEADER (Src Port: 10001, Dst Port: 554) |
| SETUP rtsp://foo.com/test.wav/streamid=0 RTSP/1.0<br>Transport: RTP/AVP/UDP; unicast;<br>            client_port=12702-12703; mode=play |

108B-2

(b)
| IP HEADER (Src IP: 2.2.2.2, Dst IP: 1.1.1.1) |
|---|
| TCP HEADER (Src Port: 40003, Dst Port: 554) |
| SETUP rtsp://foo.com/test.wav/streamid=0 RTSP/1.0<br>Transport: RTP/AVP/UDP; unicast;<br>            client_port=60000-60001; mode=play |

FIG. 9B 108B-3

(a)
| IP HEADER (Src IP: 1.1.1.1, Dst IP: 2.2.2.2) |
|---|
| TCP HEADER (Src Port: 554, Dst Port: 40003) |
| RTSP/1.0 200 OK<br>Transport: RTP/AVP/UDP; unicast; client_port=60000-60001;<br>        server_port=50002-50003; mode=play |

108B-4

(b)
| IP HEADER (Src IP: 1.1.1.1, Dst IP: 192.168.1.20) |
|---|
| TCP HEADER (Src Port: 554, Dst Port: 10001) |
| RTSP/1.0 200 OK<br>Transport: RTP/AVP/UDP; unicast; client_port=12702-12703;<br>        server_port=50002-50003; mode=play |

FIG. 10

GATEWAY DEVICE AND PORT NUMBER ASSIGNMENT METHOD

CLAIM OF PRIORITY

The present application claims priority from Japanese patent application serial no. 2009-257722, filed on Nov. 11, 2009, the content of which is hereby incorporated by reference into this application.

FIELD OF THE INVENTION

The present invention relates to a gateway device and a port number assignment method, and more particularly, to a gateway device and a port number assignment method using a real-time packet.

BACKGROUND OF THE INVENTION

Currently, to share a single global address with a plurality of terminals installed in a home, a company, and the like, a network address port translation (NAPT) is widely used (see "IP Network Address Translator (NAT) Terminology and Considerations" by P. Srisuresh et al., in August, 1999, IETF, <http://www.ietf.org/rfc/rfc2663.txt?number=2663>).

Also, a network address translation-protocol translation (NAT-PT) is known as a method of interconnecting networks using different protocols, more particularly, interconnecting a network using Internet protocol version 4 (IPv4) and a network using Internet protocol version 6 (IPv6), as a protocol (see "Network Address Translation—Protocol Translation (NAT-PT)" by G. Tsirtsis et al., in February, 2000, IETF, <http://www.ietf.org/rfc/rfc2766.txt?number=2766>).

These NAPT and NAT-PT enable interconnection between different networks by appropriately converting a port number of an IP header and a transmission control protocol (TCP)/user datagram protocol (UDP) header. However, in addition to the IP header and the TCP/UDP header, an address and a port number are described in a payload according to an application. In this case, when realizing NAPT and NAT-PT, there is a need to rewrite an address and port number information in the payload part in addition to the IP header and the TCP/UDP header.

The above conversion function is referred to as an application level gateway (ALG). Even in the case of the ALG, a position where the address or the port number is described is different in the payload according to the application. Accordingly, a rewrite rule needs to be defined for each application.

Specifically, a session initiation protocol (SIP) message needs rewrite of the payload part. JP-A-2005-073302 enables interconnection using the SIP message in an environment of using NAT-PT by converting the SIP message.

In the meantime, a real time streaming protocol (RTSP) is a protocol controlling streaming delivery of a voice, a video signal, and the like, and also corresponds to a protocol where information needing conversion is written in the payload part. In the case of the RTSP, a client port number to be used for a real-time transport protocol (RTP)/RTP control protocol (RTCP) is described in a message of a SETUP method. Accordingly, the SETUP message needs to be rewritten by an RTSP-ALG in an environment where NAPT processing or NAT-PT is performed.

In this case, when a number of digits of a client port number transferred to the payload by a client is different from a number of digits of a port number assigned by NAPT processing, a segment length of TCP is different with respect to before conversion and after conversion.

When the segment length of TCP changes, an acknowledgment number with respect to a corresponding message and a sequence number of a subsequent packet may also change. This is because a value in which the TCP segment length is added to the sequence number is used as the acknowledgement number. Also, this is because a value in which this TCP segment length is added to a previous sequence number is used as the sequence number.

To consistently maintain a session, a converter for performing NAPT processing or NAT-PT needs to have a difference list with respect to the sequence number and the acknowledgement number, and then needs to rewrite the sequence number and the acknowledgement number with respect to a packet received thereafter (see "network address translation-protocol translation (NAT-PT)"). Once the segment length of TCP changes, it may affect a sequence number of a subsequent TCP packet. Accordingly, the above conversion processing is required until the session is terminated.

In the case of RTSP, two types of deliveries such as UDP delivery and interleave (IL) delivery are specified as a delivery method. Among them, the IL delivery superimposes RTP/RTCP data on a TCP session for an RTSP control message. Accordingly, when the segment length changes, conversion cost of the sequence number and the acknowledgement number may increase significantly.

JP-A-2009-015392 discloses a study that may not decrease a transfer rate when a packet is lost by transmitting a proxy ACK in addition to the aforementioned difference list.

SUMMARY OF THE INVENTION

According to techniques disclosed in "Network Address Translation-Protocol Translation (NAT-PT)" and JP-A-2009-015392, once a segment length changes due to rewrite of a real time streaming protocol (RTSP) SETUP message, rewrite processing of a sequence number and an acknowledgement number may be continued with respect to a subsequent packet. As a result, conversion cost of the sequence number and the acknowledgement number may be used until a session is terminated.

The present invention relates to a technique that may not change a segment length when an RTSP SETUP message is rewritten. As a result, the present invention provides a gateway device and a port number assignment method that may have no need to rewrite a sequence number and an acknowledgment number of a subsequent packet.

To achieve the aforementioned objects, according to an aspect of the present invention, there is provided a gateway device including a packet distribution processing unit, a header converting unit, and a transfer processing unit, and converting a first Internet protocol (IP) address and a second IP address by referring to an IP address conversion table. The gateway device may further include a payload IP address converting unit. The payload IP address converting unit may acquire a number of digits of a second port number included in a payload of a control message, convert the second port number to a first port number having the same number of digits, store the second port number and the first port number in the IP address conversion table, and convert, to the second port number, the first port number included in a response message with respect to the control message.

According to another aspect of the present invention, there is provided a method for assigning a port number, including the steps of: receiving a message to determine a destination IP address; determining an application protocol; determining a method; determining a transfer direction; when the transfer direction is upstream, acquiring a number of digits of a request port number described in a payload of the message, assigning a port number having the same number of digits, and recording the assigned port number in the IP address conversion table; when the transfer direction is downstream, acquiring a request port number from the IP address conversion table; updating the payload; and converting an IP address and a port number described in a header of the message.

According to the embodiments of the present invention, since a segment length does not change in the case of rewriting an RTSP SETUP message even in an environment of using network address port translation (NAPT)/NAT-PT, there is no need to rewrite a sequence number and an acknowledgement number of transmission control protocol (TCP). Accordingly, it is possible to prevent deterioration of transfer capability occurring due to rewrite processing. Also, complex processing in consideration of a case where a difference list and a packet are lost is not required.

BRIEF DESCRIPTION OF THE DRAWINGS

Preferred embodiments of the present invention will now be described in conjunction with the accompanying drawings, in which.

DETAILED DESCRIPTION OF THE PREFERRED EMBODIMENTS

Hereinafter, embodiments of the present invention will be described in detail with reference to the drawings. Like elements refer to like reference numerals shown in the drawings, and the descriptions are not repeated.

Figure 1:
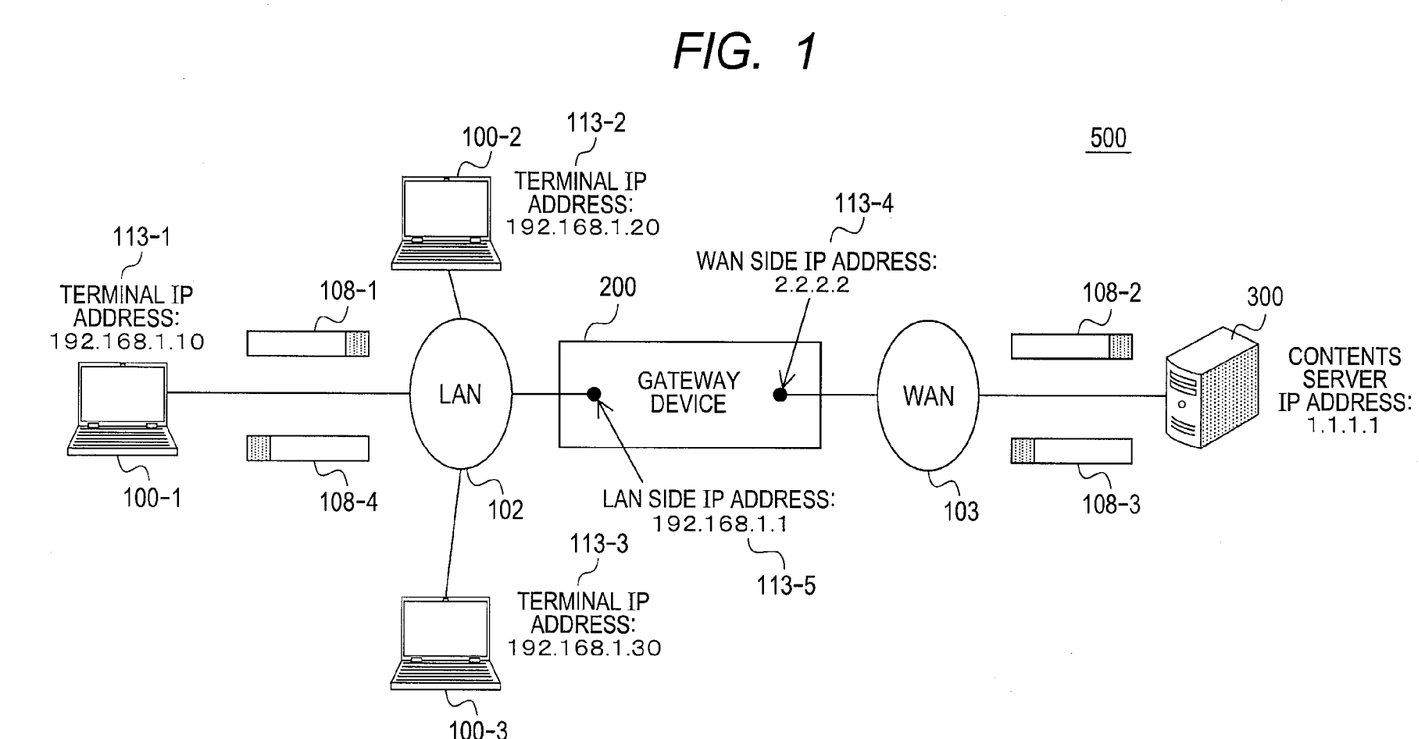
FIG. 1 is a hardware block diagram of a network system.

Initially, a network system 500 in which a gateway device 200 is applied will be described with reference to FIG. 1. In FIG. 1, the network system 500 includes a plurality of terminals 100 connected to a local area network (LAN) 102, the gateway device 200 connecting the LAN 102 and a wide area network (WAN) 103, and a contents server 300 connected to the WAN 300.

Private Internet protocol (IP) addresses 113-1 to 113-3 are assigned to terminals 100-1 to 100-3. Meanwhile, the WAN 103 is connected to the Internet and a regional network where a communication carrier is installed, and uses a global IP address. When the terminals 100-1 to 100-3 belonging to the LAN side network 102 access the contents server 300 of the WAN side network 103, the terminals 100-1 to 100-3 may perform communication by address and port conversion using a network address translation (NAT) function.

Figure 2A:
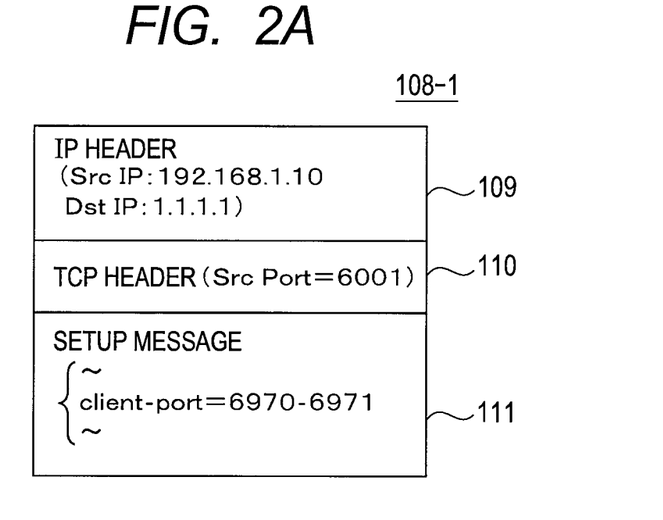
FIG. 2A is a diagram to describe a SETUP packet and a response packet thereof.

A SETUP message of real time streaming protocol (RTSP) will be described with reference to FIG. 2. FIG. 2 briefly shows an IP header 109 of a message 108, a transmission control protocol (TCP) header 110, and a message 111 of a data part. In FIG. 2A, a SETUP message 108-1 is transmitted from the terminal 100-1 to the contents server 300.

Figure 2B:
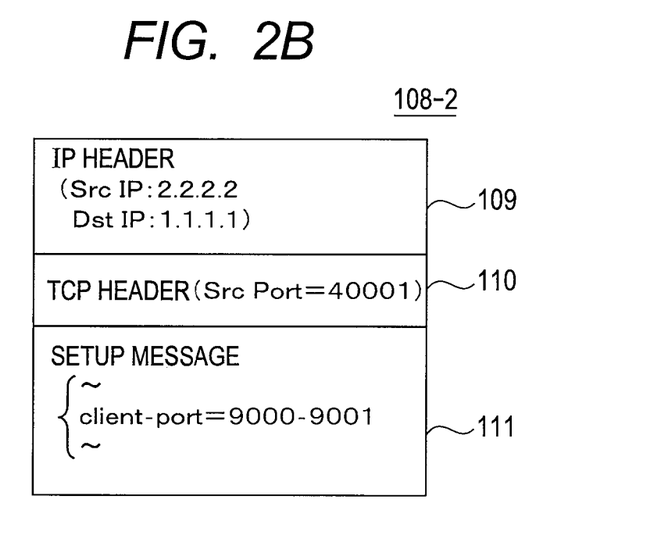
FIG. 2B is a diagram to describe a SETUP packet and a response packet thereof.

In FIG. 2B, when the packet 108-1 is received, the gateway device 200 converts Src IP (source IP address) 192.168.1.10 to IP address 2.2.2.2 of WAN side interface (I/F) 113-4 of the gateway device 200, in order to transfer the packet 108-1 to the contents server 300 belonging to the WAN 103. In addition, Src port (source port number) 6001 is also converted to a port number 40001 secured by the gateway device 200.

Figure 2C:
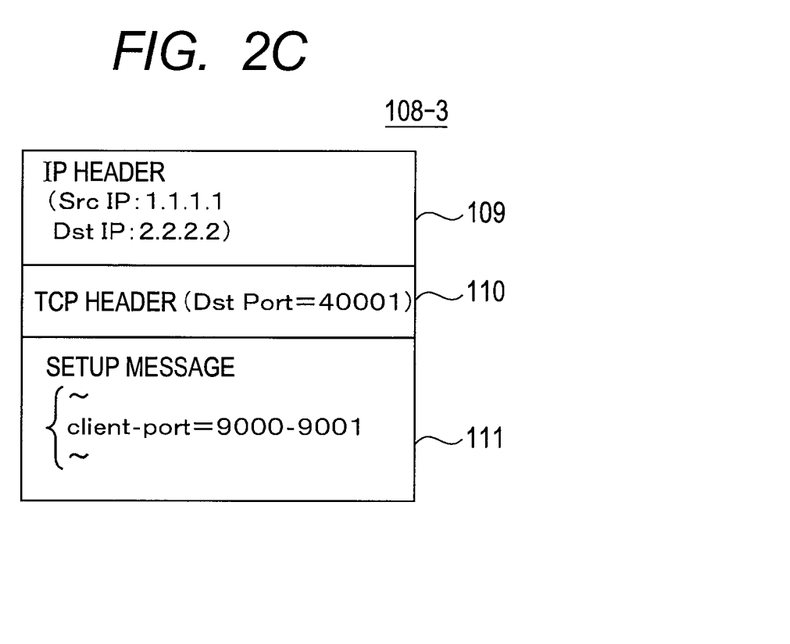
FIG. 2C is a diagram to describe a SETUP packet and a response packet thereof.
Figure 2D:
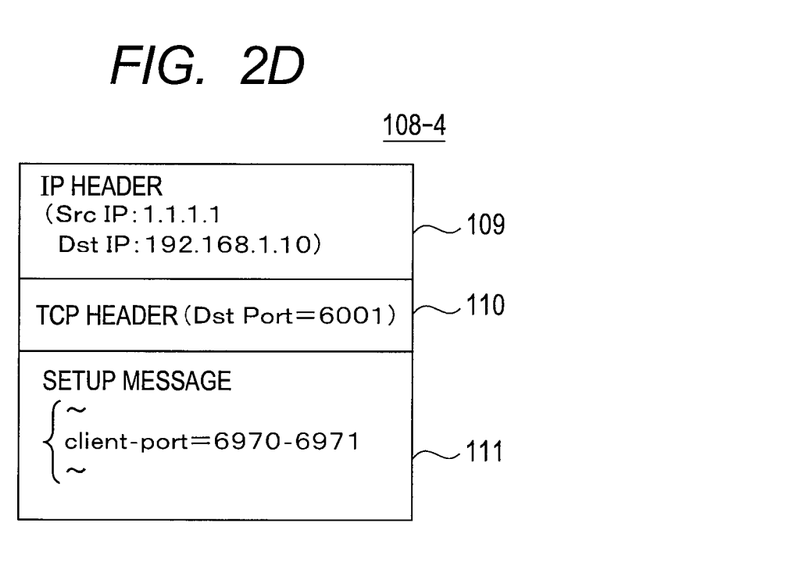
FIG. 2D is a diagram to describe a SETUP packet and a response packet thereof.

In this case, the gateway device 200 stores a corresponding relation in a NAPT table 220. Even when the gateway device 200 receives a response message 108-3 from the contents server 300, the gateway device 200 reversely converts Dst IP 2.2.2.2 (destination IP address) to 192.168.1.10, and converts Dst Port (destination port number) 40001 to 6001 by referring to the above corresponding relation. As a result, the packet reaches the terminal 100-1. A basic operation of NAPT has been described so far. FIG. 2C and FIG. 2D show a response message from the contents server 300 and a reversely converted message thereof.

However, when a SETUP message 111 is further received, the gateway device 200 registers a set of a conversion port number, a source IP address, and a conversion IP address with a number (a previous or next number when separable by "-") following "client_Port=" of the data part, in the NAPT table 220. In the case of the conversion port number to be assigned, a port number having the same number of digits as the notified port number is assigned, which will be described below. Through this, a data length of the data part does not change and thus, a sequence number and an acknowledgment number in TCP will not be affected.

Figure 3:
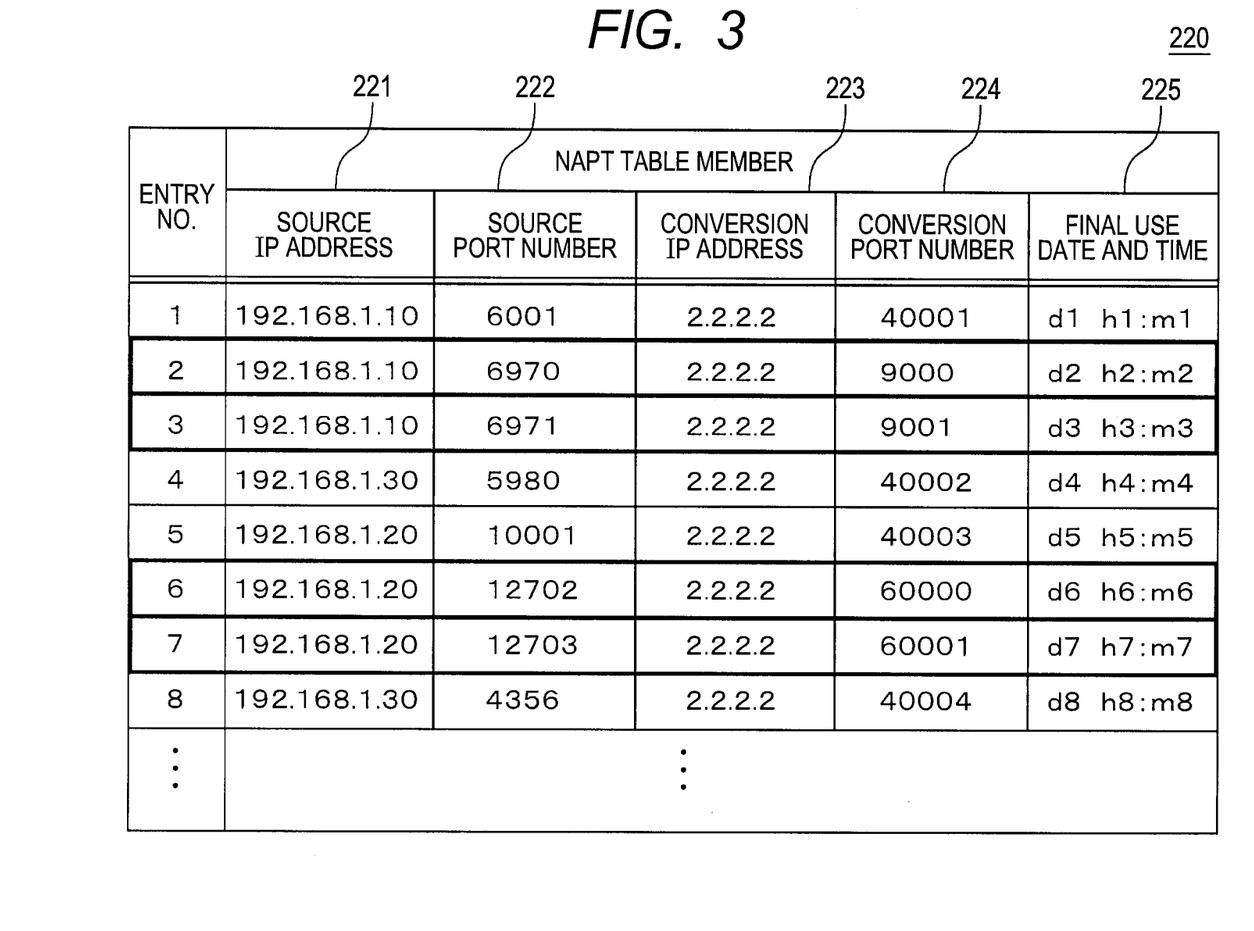
FIG. 3 is a diagram to describe a network address port translation (NAPT) table.

The NAPT table 220 will be described with reference to FIG. 3. In FIG. 3, the NAPT table 220 includes a source IP address 221, a source port number 222, a conversion IP address 223, a conversion port number 224, and a final use date and time 225.

The source IP address 221 is a private IP address used for the LAN 102. The source port number 222 is a port number of the terminal 100-1 connected to the LAN 102. The conversion IP address 223 is a WAN side IP address of the gateway device 200. The conversion port number 224 is a WAN side port number of the gateway device 200. The final use date and time 225 is a date and time when a corresponding entry is finally generated or referred to. The final use date and time 225 is used for deletion of the corresponding entry.

When a first departure packet from LAN to WAN is received, and when RTSP SETUP is received, an entry is added. In the case of a subsequently received packet, an upstream packet refers to the conversion IP address 223 and the conversion port number 224 using, as a key, the source IP address 221 and the source port number 222. A downstream packet refers to the source IP address 221 and the source port number 222 using, as a key, the conversion IP address 223 and the conversion port number 224. An entry not used for a predetermined amount of time is deleted through an aging process.

Entries 2, 3, 6, and 7 emphasized in FIG. 3 are entries registered by RTSP-application level gateway (ALG) processing. Since a source port number of each of the entries 2 and 3 is of four digits, a four-digit port number is assigned as a conversion port number. Since a source port number of each of the entries 6 and 7 is of five digits, a five-digit port number is assigned as the conversion port number. Entries 1, 4, 5, and 8 entered by general NAPT processing may be assigned with the conversion port number regardless of a number of digits of the source port number. Accordingly, empty port numbers are sequentially assigned regardless of the number of digits.

Figure 4:
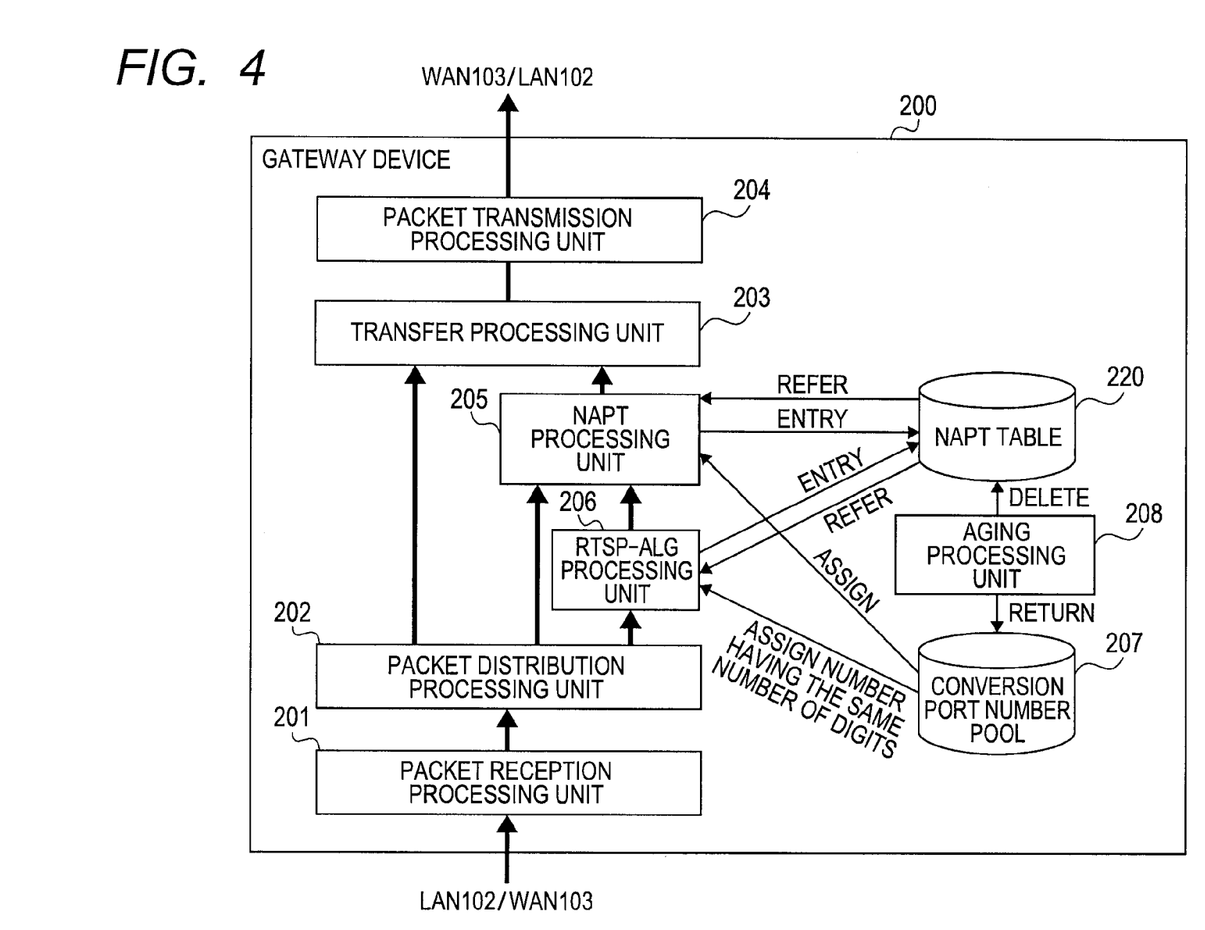
FIG. 4 is a block diagram to describe a configuration of a gateway device.

A configuration of the gateway device 200 will be described with reference to FIG. 4. The gateway device 200 includes a packet reception processing unit 201, a packet distribution processing unit 202, a transfer processing unit 203, a packet transmission processing unit 204, a NAPT processing unit 205, an RTSP-ALG processing unit 206, a conversion port number pool 207, an aging processing unit 208, and a NAPT table 220.

The packet reception processing unit 201 of LAN I/F or WAN I/F receives a packet from LAN or WAN. The packet reception processing unit 201 transfers the received packet to the packet distribution processing unit 202. The packet distribution processing unit 202 distributes the packet to the transfer processing unit 203, the NAPT processing unit 205, or the RTSP-ALG processing unit 206 based on contents of the packet. When NAPT processing such as transferring within the same network is not required, the packet distribution processing unit 202 distributes the packet to the transfer processing unit 203. When the packet is transmitted from a terminal within the LAN side network 102 to a server within the WAN side network 103, the packet distribution processing unit 202 distributes the packet to the NAPT processing unit 205.

Initially, the NAPT processing unit 205 refers to the NAPT table 220. When no entry exists, the NAPT processing unit 205 is assigned with a port number available as a conversion port number from the conversion port number pool 207, as an initially passing packet. The NAPT processing unit 205 rewrites an IP address and a port number included in an IP header and a TCP header. At the same time, the NAPT processing unit 205 makes an entry in the NAPT table 220. With respect to a packet received after a second time and a response packet from the server, the NAPT processing unit 205 rewrites and thereby transfers the packet by referring to the NAPT table 220.

In particular, when the packet received by the packet distribution processing unit 202 is a SETUP message of RTSP, the packet distribution processing unit 202 distributes the packet to the RTSP-ALG processing unit 206. The RTSP-ALG processing unit 206 detects the port number used in real-time transport protocol (RTP) and RTP control protocol (RTCP) based on contents written in the message. The RTSP-ALG processing unit 206 assigns a port number having the same number of digits as the detected port number from the conversion port number pool 207, and rewrites the message. The RTSP-ALG processing unit 206 registers the rewritten message in the NAPT table 220. When a SETUP response message is received, reversely, the RTSP-ALG processing unit 206 rewrites the message by referring to the NAPT table 220. The RTSP-ALG processing unit 206 transmits the message to the NAPT processing unit 205. The NAPT processing unit 205 performs NAPT processing and transfers the message to the transfer processing unit 203.

The aging processing unit 208 refers to the final use date and time 225 of the NAPT table 220 at predetermined cycles. The aging processing unit 208 deletes, from the NAPT table 220, an entry not used for a predetermined amount of time, and returns the assigned port number to the conversion port number pool 207.

Figure 5:
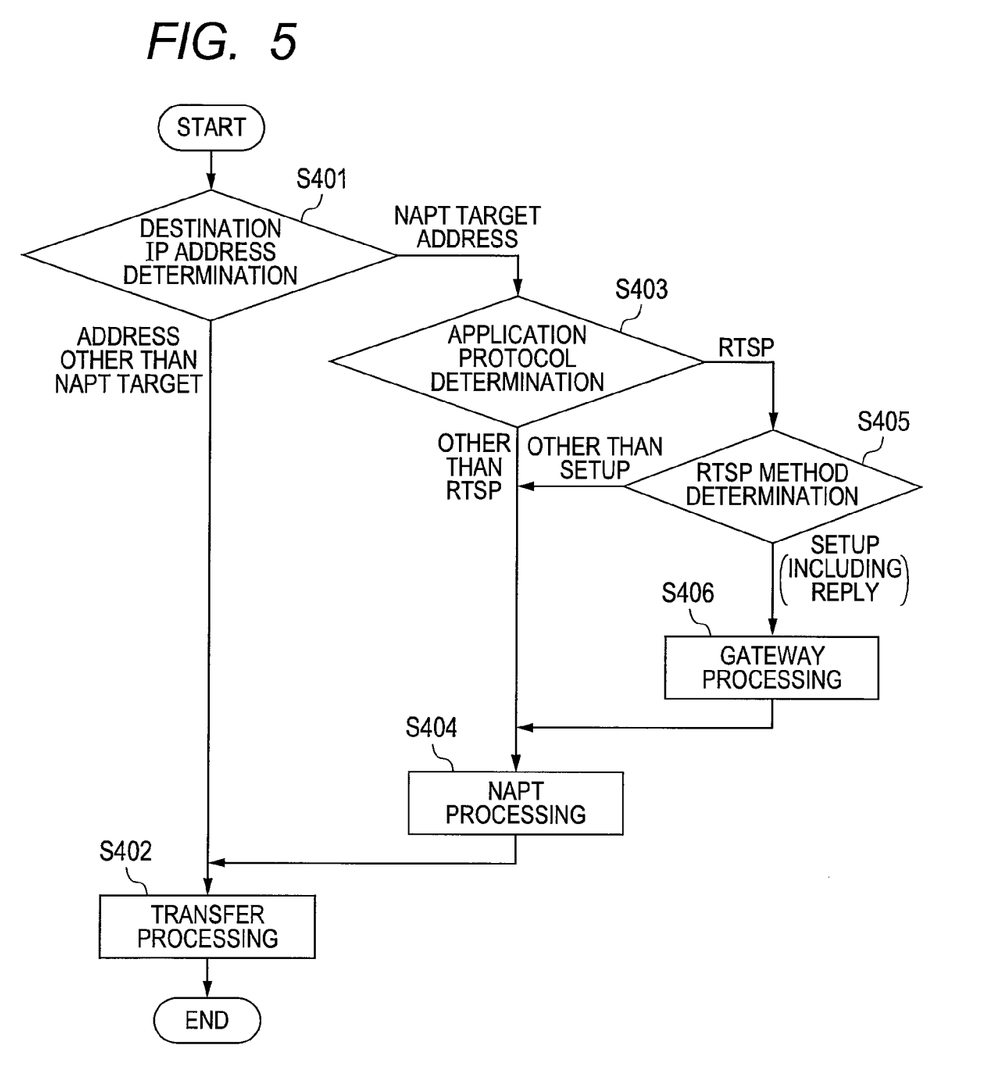
FIG. 5 is a flowchart to describe processing of a gateway device.

A processing flow of the gateway device 200 will be described with reference to FIG. 5. This flow is initiated by packet reception. When a packet is received, the gateway device 200 determines whether the received packet corresponds to NAPT target by referring to a destination IP address (S401). When the received packet does not correspond to an NAPT target address, the gateway device 200 performs general transfer processing (S402) and then terminates. When the received packet corresponds to the NAPT target address in step 401, the gateway device 200 determines an application protocol (S403). In this case, except for RTSP (destination and source port numbers are 554), the gateway device 200 performs NAPT processing (S404). Specifically, in the case of an upstream packet, NAPT processing performs source address conversion and source port conversion. On the other hand, in the case of a downstream packet, NAPT processing performs destination address conversion and destination port conversion. Where, upstream herein is communication from the terminal 100 to the contents server 300, and downstream is communication from the contents server 300 to the terminal 100.

Conversely, when the application protocol is determined as the RTSP in step 403, the gateway device 200 further determines an RTSP method (S405). Specifically, the gateway device 200 determines whether the method is SETUP. When the method is determined as a method excluding the SETUP method, the gateway device 200 goes to step 404. When the method is determined as the SETUP method (including Reply) in step 405, the gateway device 200 executes gateway processing (S406) and goes to step 404.

Figure 6:
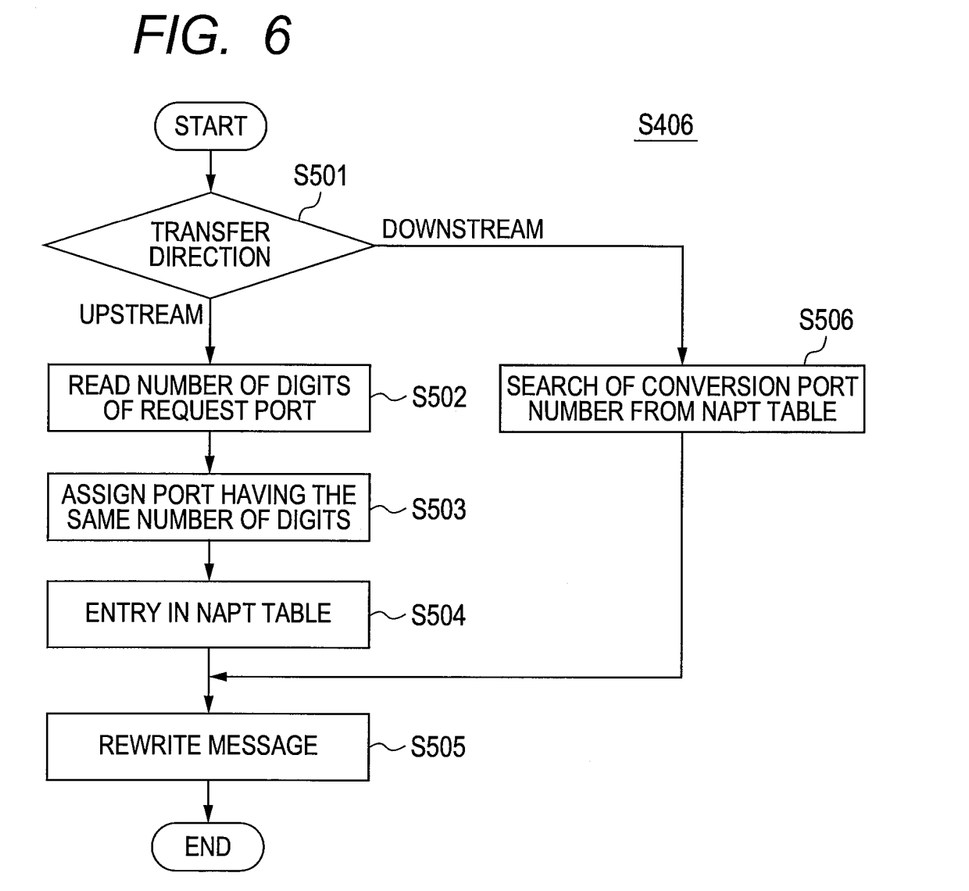
FIG. 6 is a flowchart to describe gateway processing.

The gateway processing (S406) will be described with reference to FIG. 6. The RTSP-ALG processing unit 206 determines a transfer direction (S501). In the case of upstream direction, the RTSP-ALG processing unit 206 reads a number of digits of a request port from a SETUP message (S502). The RTSP-ALG processing unit 206 assigns a port number having the same number of digits (S503). Next, the RTSP-ALG processing unit 206 makes an entry in the NAPT table 220 by making, as a set, a source address, a source port number, and a conversion address with the assigned port number. Finally, the RTSP-ALG processing unit 206 rewrites the message with the assigned port number (S505). Meanwhile, in the case of downstream direction in step 501, the RTSP-ALG processing unit 206 goes to step 505 by searching and referring to the NAPT table 220 (S506).

Figure 7:
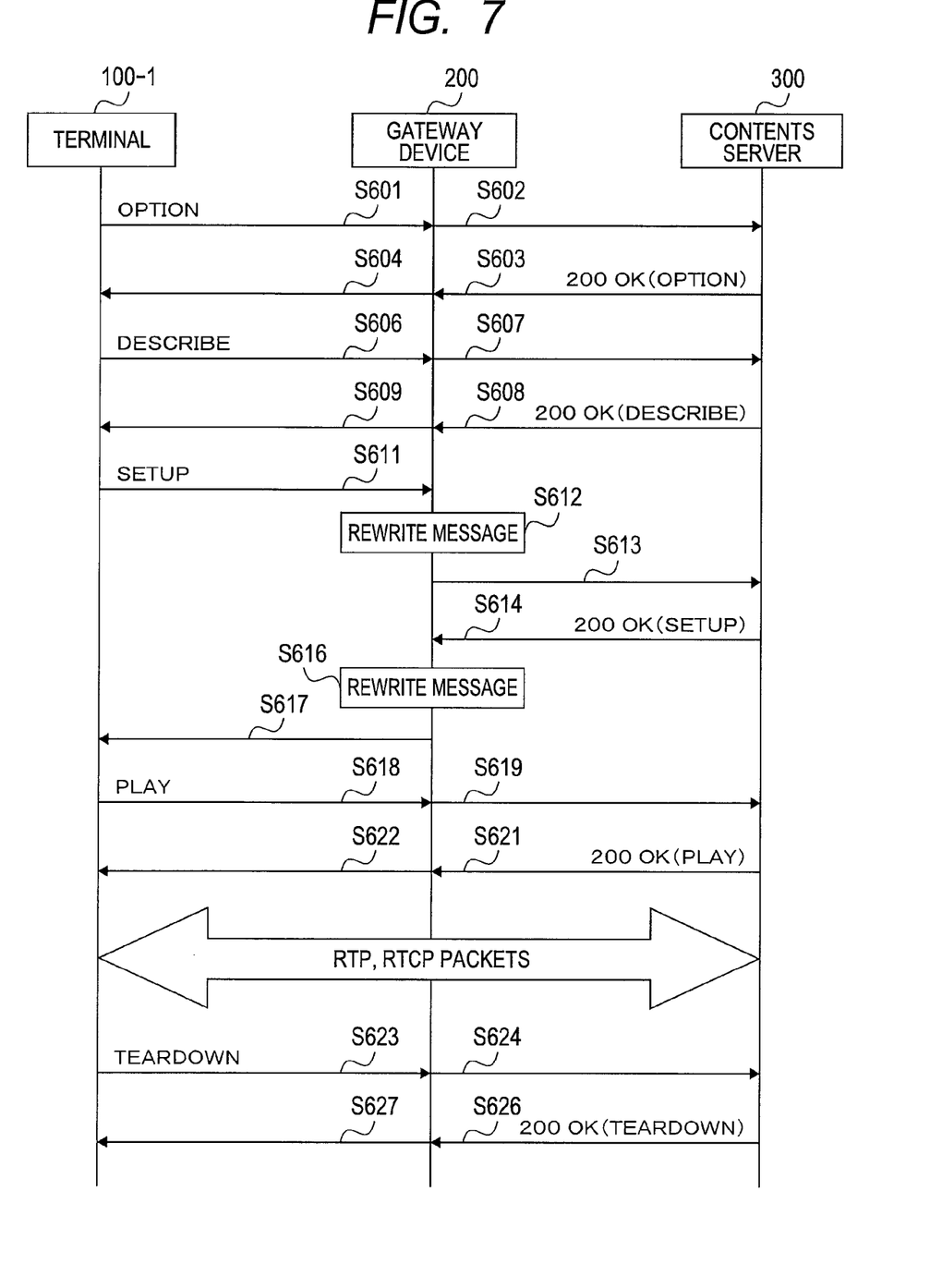
FIG. 7 is a sequence diagram from an RTSP session establishment to disconnection.

A sequence from RTSP session establishment to termination in an environment using the gateway device 200 will be described with reference to FIG. 7. In RTSP, the terminal 100-1 and the contents server 300 initially exchange available function information using an OPTION method. Next, the terminal 100-1 acquires contents information using a DESCRIBE method. In addition, the terminal 100-1 determines a transmission scheme using a SETUP method. Hereinafter, the above sequence will be described in detail.

The terminal 100-1 transmits an OPTION message describing an available function to the gateway device 200 (S601). The gateway device 200 converts a source IP address and a source port number and transmits the OPTION message to the contents server 300 (S602). The contents server 300 transmits 200 OK describing an available function to the gateway device 200 (S603). The gateway device 200 converts a destination IP address and a destination port number and transmits 200 OK to the terminal 100-1 (S604).

The terminal 100-1 transmits a DESCRIBE message for acquiring contents information to the gateway device 200 (S606). The gateway device 200 converts a source IP address and a source port number and transmits the DESCRIBE message to the contents server 300 (S607). The contents server 300 transmits 200 OK describing contents information to the gateway device (S608). The gateway device 200 converts a destination IP address and a destination port number and transmits 200 OK to the terminal 100-1 (S609).

The terminal 100-1 transmits a SETUP message describing available Transport to the gateway device 200 (S611). The gateway device 200 reads a source port number from the SETUP message and converts the read source number to a port number having the same number of digits (S612). The gateway device 200 converts a source IP address and a source port number of a header and transmits the SETUP message to the contents server 300 (S613). The contents server 300 transmits 200 OK describing selected Transport to the gateway device 200 (S614). The gateway device 200 reads a destination port number from 200 OK, and converts the read destination port number to an original source port number (S616). The gateway device 200 converts the destination IP address and the destination port number and transmits 200 OK to the terminal 100-1 (S617). The terminal 100-1 transmits a PLAY message to the gateway device 200 (S618). The gateway device 200 converts a source IP address and a source port number, and transmits the PLAY message to the contents server 300 (S619). The contents server 300 transmits 200 OK to the gateway device 200 (S621). The gateway device 200 converts a destination IP address and a destination port number, and transmits 200 OK to the terminal 100-1 (S622).

The terminal 100-1 and the contents server 300 start exchanging of an RTP packet and an RTCP packet. Subsequently, the terminal 100-1 transmits, to the gateway device 200, a TEARDOWN message that is an end of reproduction (S623). The gateway device 200 converts a source IP address and a source port number and transmits the TEARDOWN message to the contents server 300 (S624). The contents server 300 transmits 200 OK to the gateway device 200 (S626). The gateway device 200 converts a destination IP address and a destination port number and transmits 200 OK to the terminal 100-1 (S627).

In step 611, the terminal (RTSP client) 100-1 notifies a port number to be used. However, since the port number is changed in an NAT environment, the gateway device 200 rewrites a message to a conversion port number having the same number of digits. The gateway device 200 also rewrites a response message (200 OK) by referring to the NAPT table 220. Reproduction of contents uses the PLAY method. Next, streaming transfer is performed by the RTP packet and RTCP packets using a transmission method determined by the SETUP method. Finally, reproduction of contents is terminated by the TEARDOWN method.

Figure 8A:
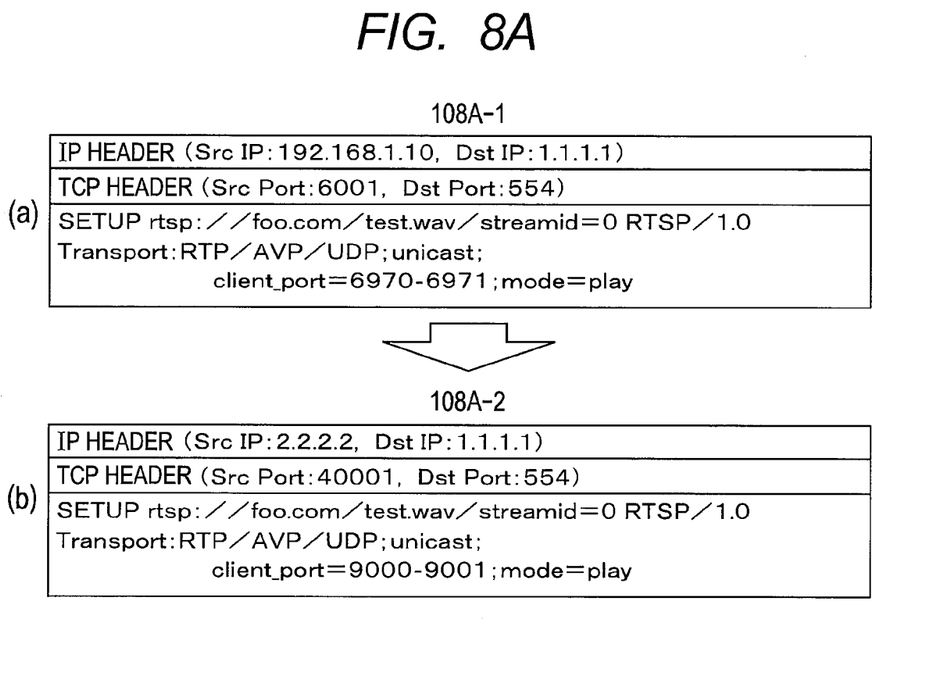
FIG. 8A shows a real time streaming protocol (RTSP) SETUP message (four-digit port number)

Contents of the message to be rewritten will be described with reference to FIG. 8A, FIG. 8B, FIG. 9A, and FIG. 9B. FIG. 8A(a) shows a message 108A-1 of the SETUP method transmitted by the terminal 100-1. Meanwhile, FIG. 8A(b) shows a message 108A-2 of the SETUP message transmitted by the gateway device 200. In FIG. 8A, the SETUP method may be determined depending on whether a character string of "SETUP" exists in a front part of a payload. A numerical value (indicating a range when separable by "-") following "client_port=" of the payload of this message indicates the source port number of the terminal side 100-1 used in RTP and RTCP. The gateway device 200 acquires a number of digits of this port number and assigns a conversion port number having the same number of digits, and rewrites the message in FIG. 8A(b).

Figure 8B:
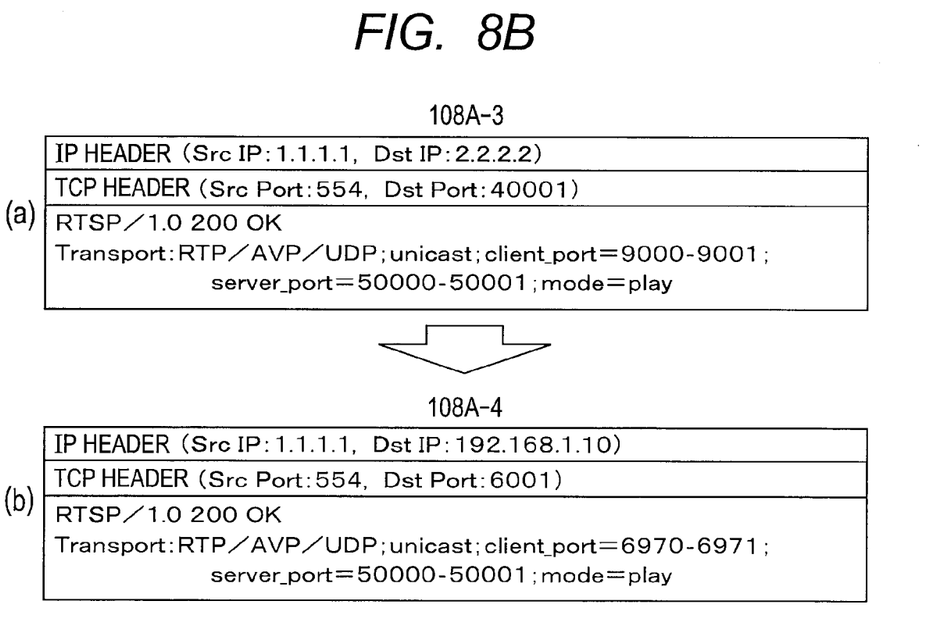
FIG. 8B shows an RTSP SETUP response message (four-digit port number)

FIG. 8B(a) shows a response message 108A-3 of the SETUP method transmitted by the contents server 300. FIG. 8B(b) shows a response message 108A-4 of the SETUP method transmitted by the gateway device 200. In FIG. 8B(a), since "client_port=" is described in this message, the gateway device 200 reversely converts a subsequent value by referring to the NAPT table 220.

Figure 9A:
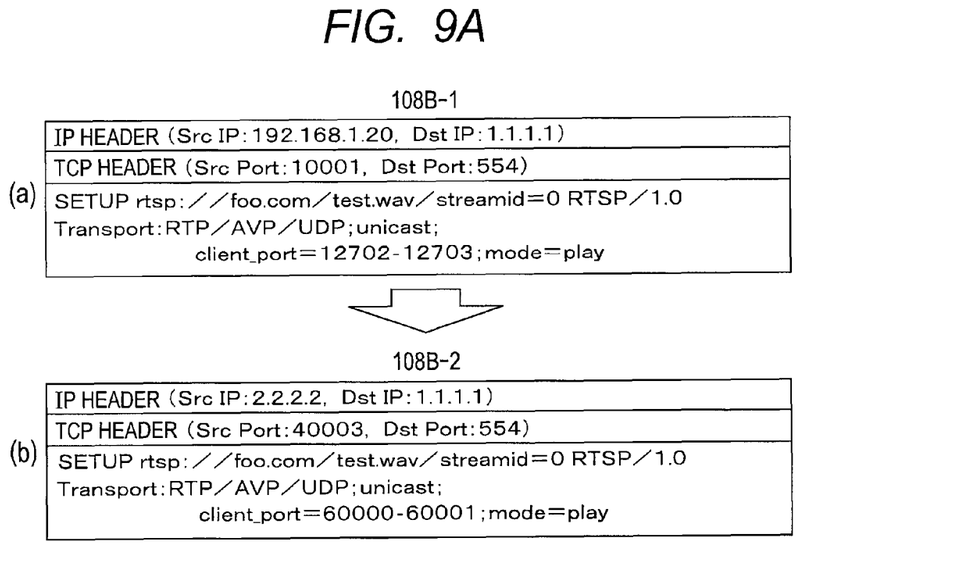
FIG. 9A shows an RTSP SETUP message (five-digit port number)
Figure 9B:
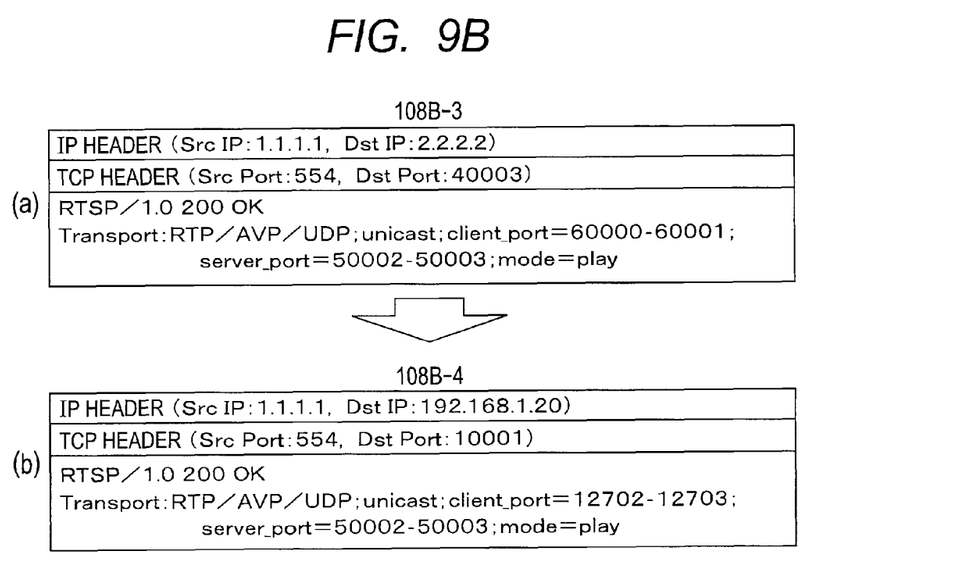
FIG. 9B shows an RTSP SETUP response message (five-digit port number)

FIG. 8A and FIG. 8B show a case where a port number has four digits. FIG. 9A and FIG. 9B show a case where the port number has five digits.

Figure 10:
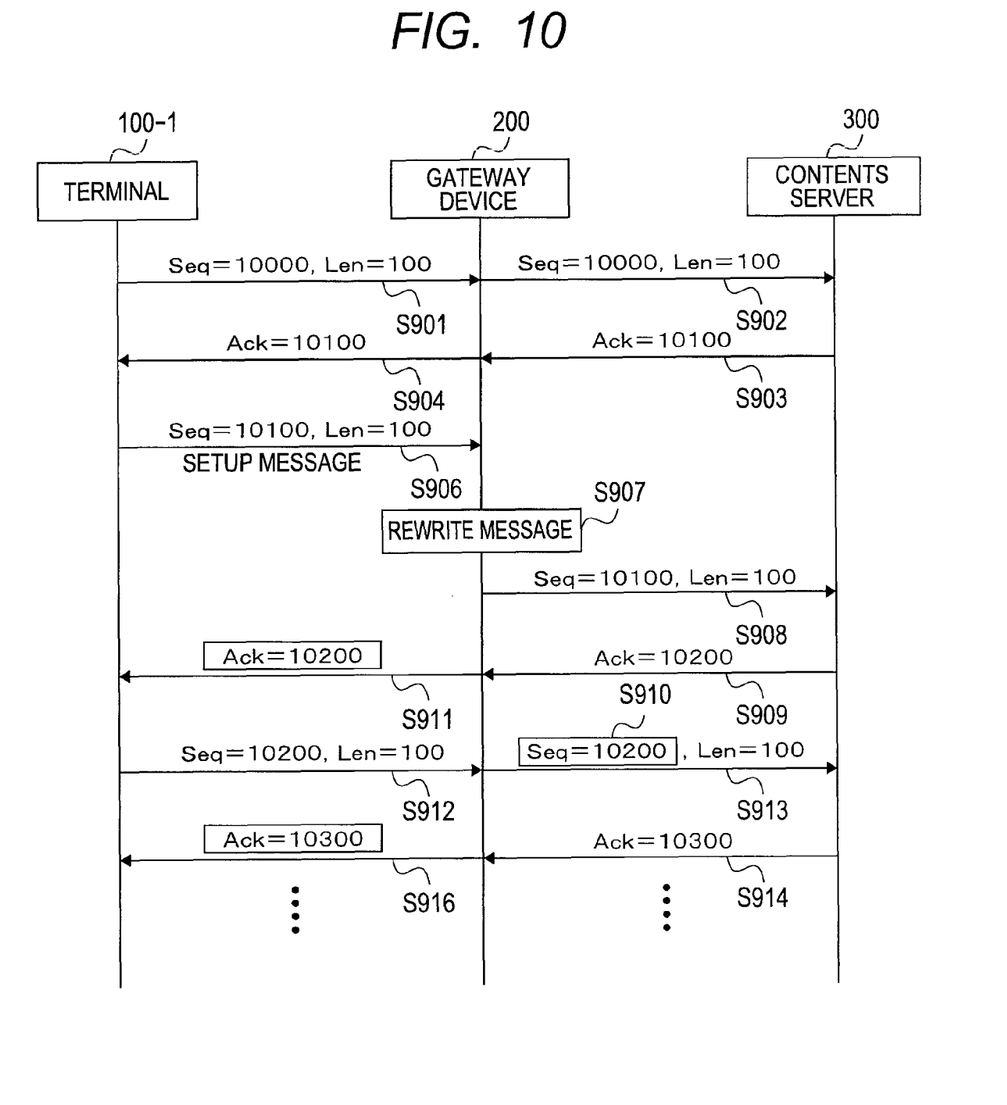
FIG. 10 is a sequence diagram to describe a sequence number and an acknowledgement number before and after a message rewrite.

A sequence number and an acknowledgement number before and after a message rewrite will be described with reference to FIG. 10. To explain plainly, FIG. 10 shows a circumstance where data only from a client to a server is described. Also, a round value is used as a segment length.

In FIG. 10, the terminal 100-1 initially transmits a packet of a segment length (Len=) 100 to the contents server 300 (S901). In this case, a sequence number (Seq=) is 10000. The gateway device 200 converts a source IP address and a source port number and transfers the packet to the contents server 300 (S902). When the packet is received, the contents server 300 returns Ack of acknowledgment number (Ack=) 10100 in order to request subsequent data (S903). The gateway device 200 converts a destination IP address and a destination port number and transfers Ack to the terminal 100-1 (S904).

Next, the terminal 100-1 transmits a SETUP message 903 of the segment length 100 (S906). The gateway device 200 rewrites the message (S907). The gateway device 200 transmits the rewritten message to the contents server 300 (S908). In this case, when the message is rewritten, the number of digits of the port number is matched and thus, the segment length does not change.

However, if the segment length changes, the gateway device 200 may need to rewrite the sequence number and the acknowledgement number indicated by the square within the range indicated in FIG. 10 in order to maintain a consistency of TCP sequence. Also, since the influence on all the subsequent acknowledgement numbers of sequence and sequence numbers is exerted, there is a need to rewrite the sequence number and the acknowledgement number.

When the packet is received, the contents server 300 returns Ack of the acknowledgement number (Ack=) 10200 in order to request subsequent data (S909). The gateway device 200 converts the destination IP address and the destination port number and transfers Ack to the terminal 100-1 (S911). The terminal 100-1 transmits the packet of the segment length (Len=) 100 to the contents server 300 (S912). In this case, the sequence number (Seq=) is 10200 which is the same as the received acknowledgement number. The gateway device 200 converts the source IP address and the source port number and transfers the packet to the contents server 300 (S913). When the packet is received, the contents server 300 returns Ack of the acknowledgement number (Ack=) 10300 in order to request subsequent data (S914). The gateway device 200 converts the destination IP address and the destination port number and transfers Ack to the terminal 100-1 (S916).

According to the present embodiment, it is guaranteed that a port number having the same number of digits is assigned as the conversion port number. Specifically, it is guaranteed that the segment length after a message rewrite does not change. Accordingly, with respect to a following sequence, there is no need to rewrite the acknowledgement number and the sequence number.

What is claimed is:

1. A gateway device comprising:
   a packet distribution processing unit,
   a header converting unit,
   a transfer processing unit, and
   a payload IP address converting unit,
   wherein the gateway device is configured to convert a first Internet protocol (IP) address and a second IP address by referring to an IP address conversion table,
   wherein the payload IP address converting unit is configured to:
   acquire a number of digits of a second port number included in a payload of a control message;
   convert the second port number to a first port number having the same number of digits;
   store the second port number and the first port number in the IP address conversion table;
   convert, to the second port number, the first port number included in a payload of a response message with respect to the control message; and
   equalize segment lengths by matching the number of digits of the port numbers during the conversion.

2. The gateway device according to claim 1, further comprising:
   a conversion port number pool,
   wherein the conversion port number pool comprises the first port number of a plurality of numbers of digits, and
   wherein the payload IP address converting unit is assigned the first port number from the conversion port number pool.

3. The gateway device according to claim 2, further comprising:
   an aging processing unit,
   wherein the IP address conversion table records finally used time information in each record, and
   wherein the aging processing unit is configured to return, to the conversion port number pool, the first port number recorded in a corresponding record based on the time information.

4. A method for assigning a port number, comprising the steps, performed by a gateway device, of:
   receiving a message to determine a destination IP address;
   determining an application protocol;
   determining a method;
   determining a transfer direction;
   when the transfer direction is upstream:
      acquiring a number of digits of a request port number described in a payload of the message,
      assigning a port number having the same number of digits, and
      recording the assigned port number in the IP address conversion table; and
   when the forwarding direction downstream:
      acquiring a request port number from the IP address conversion table;
      updating the payload;
      converting an IP address and a port number described in a header of the message; and
      equalizing segment lengths by matching the number of digits of the port numbers during the conversion.

* * * * *